(12) United States Patent
Brumett, Jr. et al.

(10) Patent No.: US 8,412,385 B2
(45) Date of Patent: *Apr. 2, 2013

(54) POWER MANAGEMENT

(75) Inventors: Thomas D. Brumett, Jr., San Jose, CA (US); Ian Chen, Campbell, CA (US); Ilbok Lee, Los Altos Hills, CA (US); Marcelo Martinez, Davis, CA (US)

(73) Assignee: Silego Technology, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/806,235

(22) Filed: Aug. 5, 2010

(65) Prior Publication Data

US 2011/0093130 A1    Apr. 21, 2011

Related U.S. Application Data

(63) Continuation of application No. 11/305,885, filed on Dec. 15, 2005, now Pat. No. 7,797,083.

(60) Provisional application No. 60/636,628, filed on Dec. 15, 2004.

(51) Int. Cl.
*G06F 19/00* (2011.01)
(52) U.S. Cl. ........................................ 700/292; 713/322
(58) Field of Classification Search .............. 700/22, 700/292, 296; 375/295, 146; 370/209, 335; 455/69, 522, 125–127; 361/172, 164, 139, 361/143; 713/322
See application file for complete search history.

(56) References Cited

U.S. PATENT DOCUMENTS

| | | | | |
|---|---|---|---|---|
| 5,021,679 A * | 6/1991 | Fairbanks et al. | ............... | 307/66 |
| 5,408,197 A * | 4/1995 | Miyake | .................. | 330/129 |
| 5,416,797 A * | 5/1995 | Gilhousen et al. | ............ | 370/209 |
| 5,566,363 A * | 10/1996 | Senda | .................. | 455/126 |
| 5,574,993 A * | 11/1996 | Kobayashi et al. | ........... | 455/126 |
| 5,841,806 A * | 11/1998 | Gilhousen et al. | ............ | 375/146 |
| 5,982,760 A * | 11/1999 | Chen | .................. | 370/335 |
| 6,711,389 B2 * | 3/2004 | Medl et al. | .................. | 455/127.2 |
| 7,295,949 B2 * | 11/2007 | Vorenkamp et al. | .......... | 702/182 |
| 2002/0097031 A1 * | 7/2002 | Cook et al. | .................... | 323/273 |
| 2003/0222603 A1 * | 12/2003 | Mogilner et al. | ............. | 315/294 |
| 2004/0121827 A1 * | 6/2004 | Murakami et al. | ......... | 455/575.7 |
| 2007/0206542 A1 * | 9/2007 | Proctor | .................. | 370/335 |

* cited by examiner

*Primary Examiner* — Kidest Bahta
(74) *Attorney, Agent, or Firm* — Van Pelt, Yi & James LLP

(57) ABSTRACT

Communicating a power control feedback signal from a system is disclosed. In some embodiments, upon determining how to control input power which may be based at least in part, for example, on an in situ measurement of an operating condition in an operating environment, an appropriate symbol is constructed based upon the determination and is transmitted on a single line. In some embodiments, the single line corresponds to the reference voltage of an associated power supply.

15 Claims, 13 Drawing Sheets

POWER MANAGEMENT

CROSS REFERENCE TO OTHER APPLICATIONS

This application is a continuation of U.S. patent application Ser. No. 11/305,885, entitled COMMUNICATING A POWER CONTROL FEEDBACK SIGNAL filed Dec. 15, 2005 now U.S. Pat. No. 7,797,083 which is incorporated herein by reference for all purposes, which claims priority to U.S. Provisional Patent Application No. 60/636,628, entitled POWER MANAGEMENT filed Dec. 15, 2004, which is incorporated herein by reference for all purposes.

BACKGROUND OF THE INVENTION

Typically, a system that is powered by a programmable power supply communicates power control feedback signals using an I$^2$C or similar digital data interface, which requires two-pin signaling. For devices that have only a small number of total pins, it may not be desirable or practical to dedicate two pins for power control signaling. In such cases, it would be useful to limit power control signaling to only a single pin. Moreover, if a single line power control feedback signal or a signal derived from the power control feedback signal is used to drive a single input pin (e.g., reference voltage) of a power supply, it is possible to make even a non-programmable supply programmable.

Thus, there is a need for an improved way to communicate a power control feedback signal.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Communicating a power control feedback signal from a system is disclosed. In some embodiments, upon determining how to control input power which may be based at least in part, for example, on an in situ measurement of an operating condition in an operating environment, an appropriate symbol is constructed based upon the determination and is transmitted on a single line. In some embodiments, the single line corresponds to the reference voltage of an associated power supply.

Although a power supply that outputs voltage may be described, the techniques disclosed herein may be similarly employed with respect to any other appropriate power supply configuration and corresponding power output type such as, for example, current.

Figure 1:
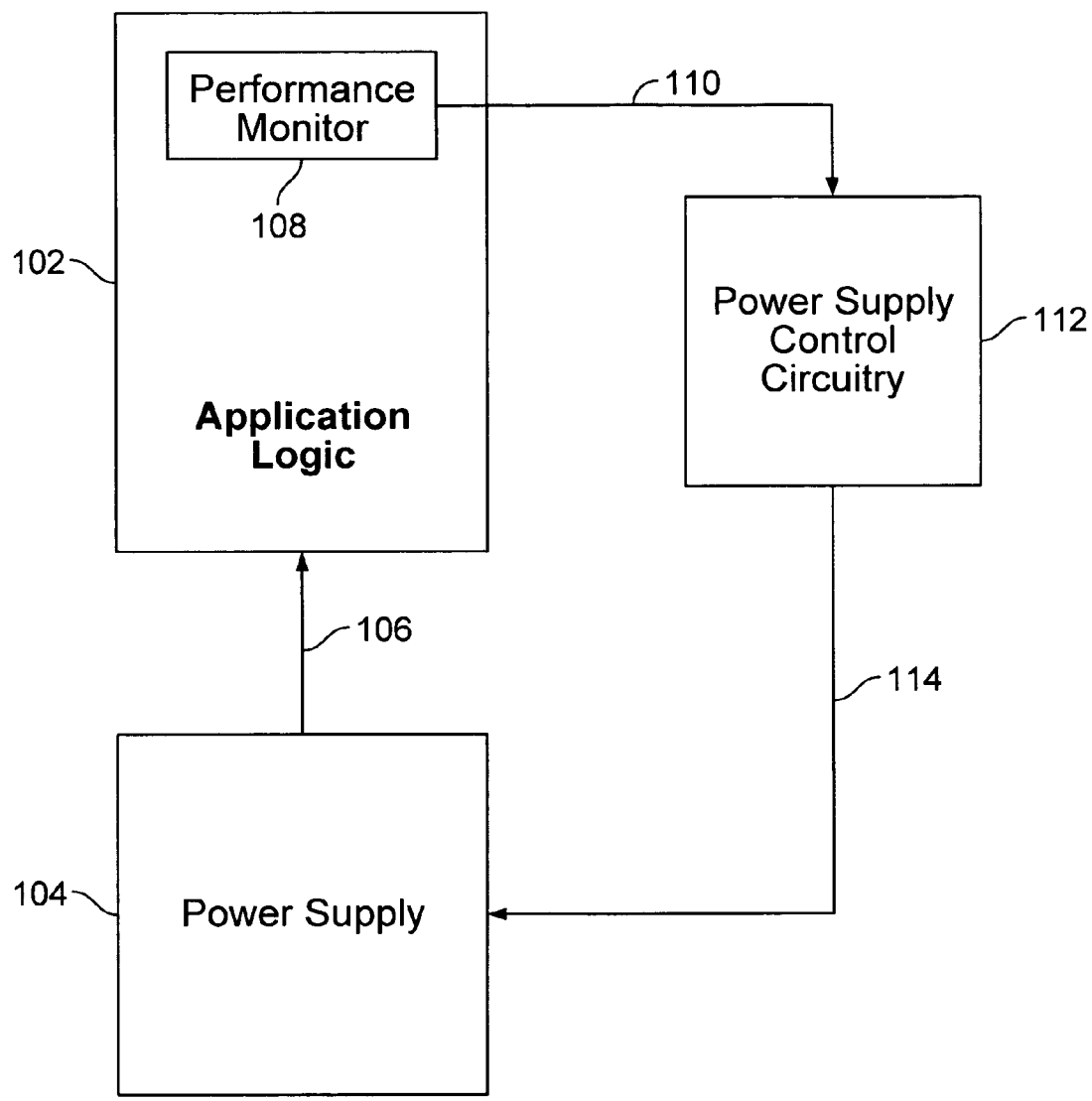
FIG. 1 illustrates an embodiment of a system for adaptively adjusting the voltage supplied to a device by a power supply.

FIG. 1 illustrates an embodiment of a system for adaptively adjusting the voltage supplied to a device by a power supply. Device 102 represents the target device for which it is desirable to reduce overall power consumption and may be a stand-alone device or a part of a larger device or system. In some embodiments, power consumption is proportional to $CV^2F$, where "C" represents capacitance, "V" represents operating voltage, and "F" represents operating frequency. Typically, devices rely on reducing clock frequency whenever possible to achieve a directly proportional reduction in device power consumption. Clock frequency changes based on the different operating states of the device may be directly managed by system firmware, and on-chip clock dividers may be used to implement the speed changes. Reducing the voltage supplied to a device when operating conditions allow also results in reducing power consumption and delivers power savings proportional to the difference of the squared supply voltages. Dynamically adjusting the voltage supplied to a device based upon current device operating conditions is possible, for example, with the configuration illustrated in FIG. 1.

In the given example, power supply 104 provides supply voltage 106 to device 102. At any given instance, the minimum supply voltage necessary to ensure proper operation of device 102 is dependent upon factors such as current operating frequency, semiconductor process parameters (e.g., oxide thickness, channel length, etc.), environmental variables (e.g., temperature), the critical delay path of the device, etc. In some embodiments, a dedicated component, such as performance monitor 108, is embedded in device 102 to gauge the current operating conditions of the device and determine the manner in which supply voltage 106 should be varied to minimize overall power consumption while still ensuring the operational integrity of the device. For example, when performance monitor 108 identifies that the current supply voltage 106 applied to device 102 is in excess of what is required for the present performance demands of the device 102, it in some way signals power supply 104 to lower the supply voltage 106. Performance monitor 108 continues monitoring device conditions and may signal power supply 104 to lower supply voltage 106 until a minimum operationally safe voltage level is achieved. The voltage may be held at this optimal value until changing device conditions, e.g., a different clock frequency, a different ambient temperature, etc., permit a further reduction in the applied voltage or require an increase in the applied voltage level for proper device operation. Such changing device conditions are detected by performance monitor 108, which appropriately signals power supply 104 so that an optimal voltage 106 can be supplied to device 102.

Performance monitor 108 generates a signal 110 based upon current operating conditions that identifies, for example, whether supply voltage 106 should be increased, decreased, held constant, or reset to a nominal maximum value. As illustrated in the given example, signal 110 is input into power supply control circuitry 112. Power supply control circuitry 112 converts signal 110 into an appropriate input signal 114 for power supply 104. In some embodiments, signal 114 corresponds to the reference voltage of power supply 104. Based upon the value of signal 114, power supply 104 appropriately adjusts the voltage 106 supplied to device 102. For example, power supply 104 may increase, decrease, reset, or hold constant the voltage 106 supplied to device 102. In the given example, power supply control circuitry is a stand-alone component that interfaces with power supply 104. In alternative embodiments, power supply control circuitry 112 is integrated into power supply 104, and, in such cases, signal 110 generated by performance monitor 108 is directly input into power supply 104.

As described with respect to the given example, by monitoring the real time operating conditions of a system or device, such as device 102, using a dedicated component such as performance monitor 108 that is embedded within the device, it is possible to optimize the real time voltage supplied to the device. Active power reduction has many advantages, such as extending battery life, eliminating the need for one or more fans and/or heat sinks in a device, improving device reliability, etc. In some embodiments, by monitoring the real time performance of a device or system, it is possible to drive the device to operate in a desired manner, even if it does not meet design specifications. Consequently, using such a technique, out-of-spec devices may be used, higher levels of performance may be achieved, and/or high speed testing of devices may be eliminated.

A variety of control structures can be used to implement a performance monitor, such as performance monitor 108 of FIG. 1, that monitors device performance under various operating conditions in order to determine the manner in which the applied voltage to a device should be varied, if at all. When reducing the applied voltage to a device, it is imperative to ensure that critical path timing violations do not occur so that the operational integrity of the device is not compromised. Since the effect of lowering the voltage supplied to a system or device causes slower propagation of signals through device logic elements due to increased gate delays, this can serve as a basis for designing mechanisms to control the voltage applied to a device. The applied voltage can be lowered as long as critical path timing violations do not occur.

In some embodiments, the manner in which the applied voltage should be varied is based at least in part upon determining whether a test pulse propagates through at least the critical path of a device. The critical path of a device may be identified through device characterization and/or simulation. When the test pulse propagates through a delay path that is beyond the critical path, the applied voltage can be lowered. When the propagation of the test pulse approaches a point where it is close to but still beyond the critical path point, the applied voltage should no longer be lowered but maintained at this minimum value associated with propagation only slightly beyond the critical path point so that device power consumption can be minimized while still ensuring operational integrity. Since an increase or decrease in system clock frequency results in a corresponding increase or decrease in the length of the critical path of a system, a control structure based on critical path propagation should accommodate changes in effective critical path length due to changes in system operating frequency. This can be accomplished by employing the system clock as the test pulse.

Figure 2:
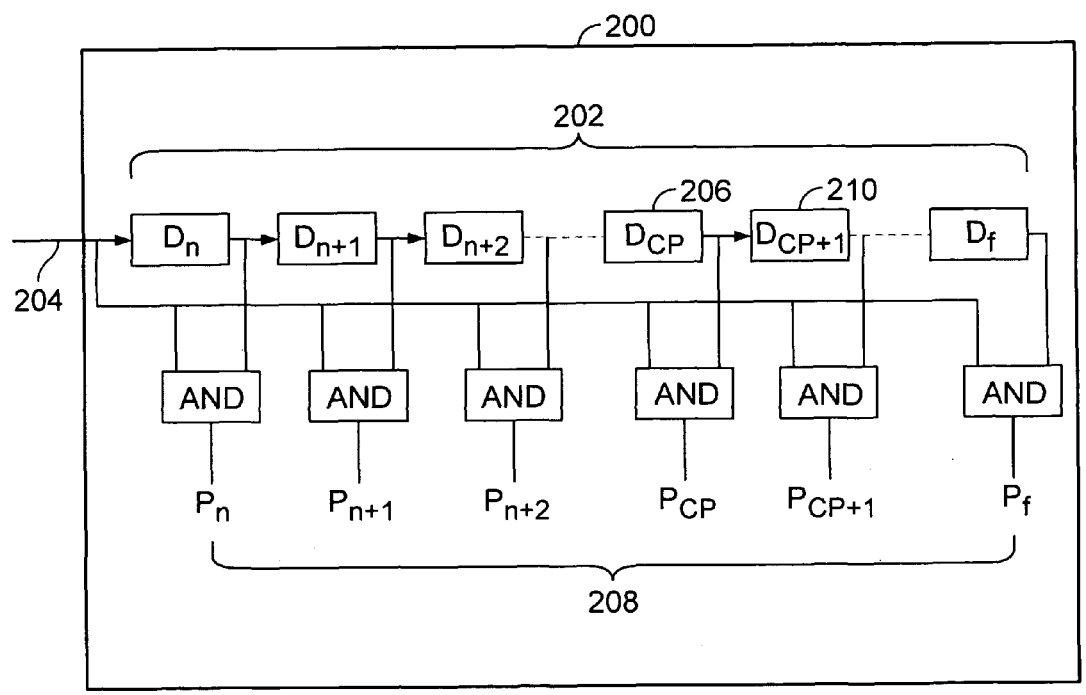
FIG. 2 illustrates an embodiment of a manner in which a performance monitor based at least in part on the critical path delay of an associated device may at least in part be implemented.

FIG. 2 illustrates an embodiment of a manner in which a performance monitor based at least in part on the critical path delay of an associated device may at least in part be implemented. In some embodiments, performance monitor 200 corresponds to performance monitor 108 of FIG. 1. As depicted in the given example, performance monitor 200 includes a chain of delay elements 202 ($D_n \ldots D_f$) connected in series. A signal 204 that corresponds to or represents the system clock is input into performance monitor 200 and is transmitted through delay chain 202. The total delay of delay chain 202 is longer than the critical path delay of an associated device. In the given example, delay element $D_{cp}$, 206 represents the critical path delay element. Signal 204 should propagate through at least $D_{cp}$, 206 in delay chain 202 in order to satisfy the critical path of the device. In some embodiments, the total delay associated with delay elements $D_n$ through $D_{cp}$, includes a guard band, i.e. the corresponding delay is somewhat greater than the actual critical path delay of the device, to provide a safety margin for proper device operation. As signal 204 propagates through the various stages of delay chain 202, the pulse width of signal 204 degrades due to propagation delays associated with the elements of delay chain 202. As depicted in the given example, a comparison is made at each stage of delay chain 202 between a corresponding delayed version of signal 204 and a non-delayed version of signal 204. If a pulse ($P_n \ldots P_{cp} \ldots P_f$) 208 appears from comparing (AND functions) the delayed and non-delayed versions of signal 204 at any stage, the signal 204 has successfully propagated to that particular stage. As long as a pulse appears at comparison points beyond delay element $D_{cp}$ 206, the applied voltage can be lowered. In some embodiments, the applied voltage is lowered only if a pulse appears past delay element $D_{cp+1}$ 210 in order to maintain an adequate safety margin to ensure proper device operation. Although not shown in FIG. 2, performance monitor 200 may include additional components, such as, for example, control logic to generate an appropriate output signal such as signal 110 of FIG. 1 based upon the presence and/or absence of one or more pulses 208, one or more interfaces, etc. As described, in the embodiment of FIG. 2, delayed and non-delayed versions of a signal corresponding to the current system clock are compared to determine the extent to which it propagates beyond the critical path of the system in order to determine if the applied voltage can be lowered.

In some embodiments, the phase shift of a signal corresponding to or representing the current system clock signal that has passed through a delay element corresponding to the critical path of a device is determined with respect to a non-delayed or non-phase shifted version of the signal in order to determine if the applied voltage can be lowered. In such cases, if the signal shifted in phase by the critical path delay advances in phase against the non-delayed version, it is because the delay path is getting longer as operating voltage gets lower. If the signal delayed by the critical path delay retreats in phase against the non-delayed version, it is because the delay path is getting shorter as the current operating voltage becomes higher than necessary. The relative phase shift difference, therefore, can serve as a way of determining the manner in which the applied voltage should be varied. When the phase shift of the signal applied through the critical path delay element with respect to the non-delayed version of the signal is $2\pi$, for example, the applied voltage is at a minimum allowable level. Thus, in some embodiments, in order to minimize power consumption, the applied voltage is lowered until the phase shift between the critically delayed signal and a non-delayed version of the signal is at or near $2\pi$ (or $3\pi/2$ or $\pi$, for example, depending on system design techniques).

Figure 3A:
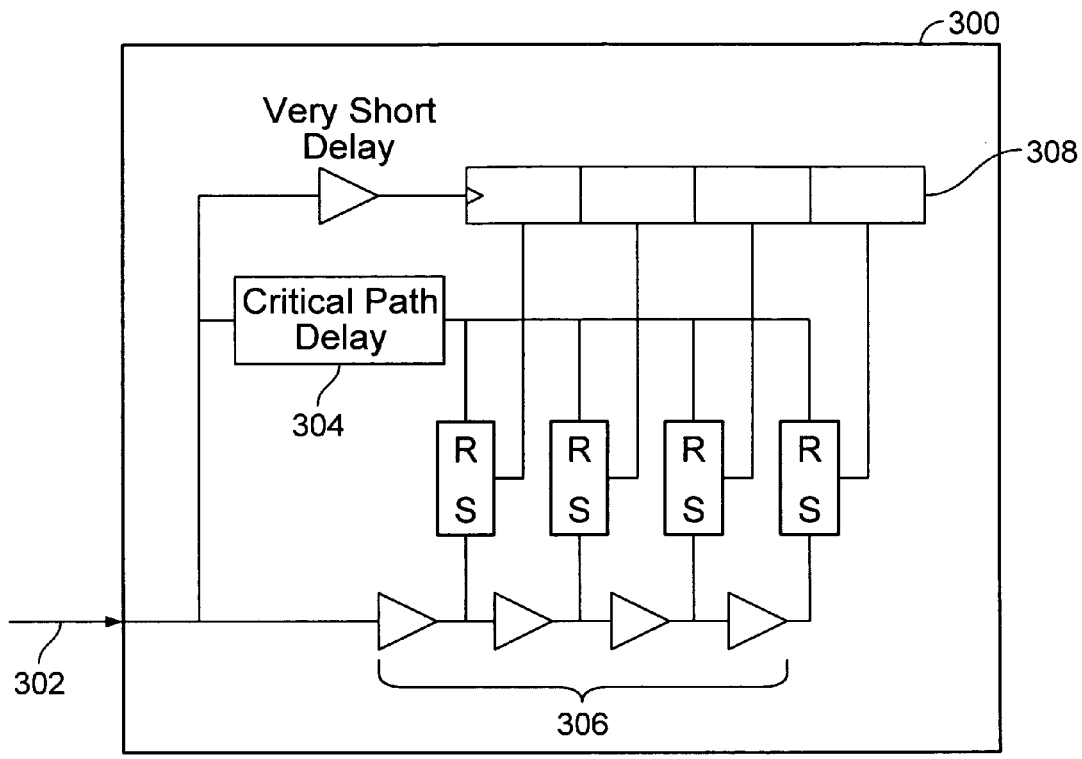
FIG. 3A illustrates an embodiment of a manner in which a performance monitor based at least in part on the phase shift of a signal delayed by the critical path delay of an associated device may at least in part be implemented.
Figure 3B:
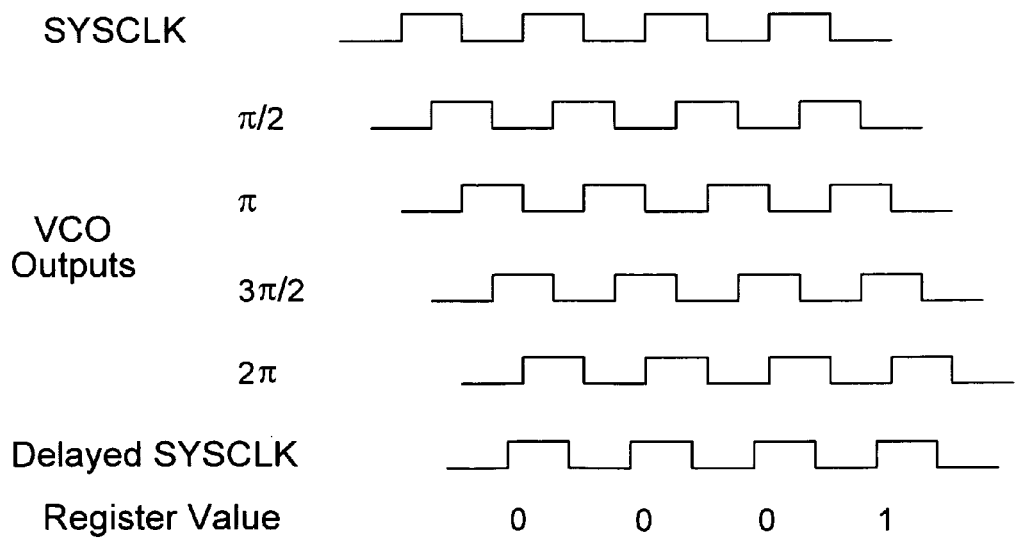
FIG. 3B illustrates an example of the signals associated with performance monitor 300.

FIG. 3A illustrates an embodiment of a manner in which a performance monitor based at least in part on the phase shift of a signal delayed by the critical path delay of an associated device may at least in part be implemented. In some embodiments, performance monitor 300 corresponds to performance monitor 108 of FIG. 1. A signal 302 that corresponds to or represents the current system clock is input into performance monitor 300 and is transmitted through a critical path delay element 304 as well as an N-stage voltage controlled oscillator (VCO) 306 that is adjusted to correspond to a single system clock cycle. In the given example, VCO 306 includes four stages (each stage then represents $\pi/2$ degrees of clock period phase). In alternative embodiments, VCO 306 may be implemented with a different number of stages, depending, for example, on the resolution of the phase difference between the critically delayed and non-delayed versions of the signal that is desired to be detected. The phase shift results are captured in a register 308 whose value may be appropriately decoded. Although not shown in FIG. 3A, performance monitor 300 may include additional components, such as logic for decoding the value captured in register 308 and generating an appropriate output signal such as signal 110 of FIG. 1 based upon that value, one or more interfaces, etc. FIG. 3B illustrates an example of the signals associated with performance monitor 300. In the given example, the phase shift between the critically delayed version of the system clock and the non-delayed version is between $3\pi/2$ and $2\pi$.

Each of the configurations of FIGS. 2 and 3A are based at least in part on the critical path delay of an associated device. The critical path delay of a device may be extracted during device simulation and/or characterization. Automated design tools can be used to identify the critical path within a device. In some embodiments, the digital logic cell library used ensures that the speed of its cell elements degrades proportionally with lower operating voltage. When a critical path delay is implemented (e.g., in the configuration of FIGS. 2 and 3A), a delay path longer than the actual critical path may be used to ensure proper device operation. In some embodiments, the amount of extra delay, or guard band, is made selectable via software. In such a case, for example, an appropriate guard band can be selected based upon characterization tests over a wide range of parameters (e.g., temperature, voltage, current, etc.) performed on the associated silicon. Some embodiments may include multiple critical delay paths and/or critical path delay values that are appropriate for different expected operating modes of the associated silicon to achieve greater optimization.

In some embodiments, critical path timing violations may be avoided by establishing a reference value associated with the performance of a device under worst case operating conditions and by ensuring that device performance does not degrade below this reference value. The reference value may be determined through simulation and/or characterization of the device or a part of the device under a set of worst case conditions. For example, a set of worst case conditions may include the highest operating frequency, lowest supply voltage, highest ambient temperature, slowest semiconductor process, etc., at which a device still operates properly. The reference value may include a guard band to provide a safety margin for the device.

In some embodiments, a performance monitor based at least in part on comparing current operation with a reference value to determine the manner in which the applied voltage of an associated device should be varied includes an oscillator such as a ring oscillator or a voltage controlled oscillator. Since the frequency of an oscillator is proportional to the applied voltage, the oscillator's minimum acceptable frequency under a set of worst case device operating conditions may serve as a reference value that can be used to determine the manner in which the applied voltage to a device should be varied during device operation. The worst case acceptable frequency of the oscillator may be stored and compared with the frequency of the oscillator during normal device operation. If at any point, the oscillator frequency is higher than the worst case reference frequency, the voltage applied to the device can be lowered so that power is conserved. As the voltage applied to the device is lowered, new values representing the current oscillator frequency are captured and compared against the worst case reference frequency. The applied voltage can be lowered until the oscillator frequency approaches a value close to the worst case value. Once the ring oscillator is operating at or slightly faster than its reference value, the applied voltage of the device is held at that value at least until further changes in oscillator performance are detected. An advantage of this technique for monitoring the performance of a device is that is it applicable in both synchronous and asynchronous systems since device performance versus applied voltage is a function of only the oscillator frequency. Although an oscillator and a reference value based on its frequency have been described, any other appropriate component and/or associated reference value may be employed in alternative embodiments.

Figure 4:
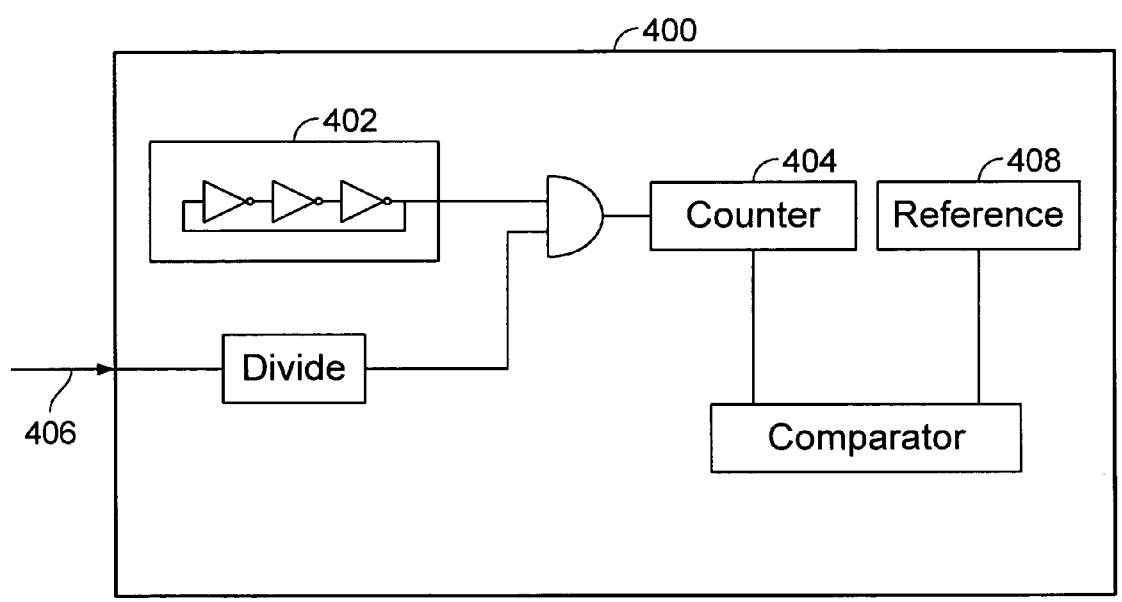
FIG. 4 illustrates an embodiment of a manner in which a performance monitor based at least in part on comparing the operating frequency of an oscillator with a reference value associated with worst case device operating conditions may at least in part be implemented.

FIG. 4 illustrates an embodiment of a manner in which a performance monitor based at least in part on comparing the operating frequency of an oscillator with a reference value associated with worst case device operating conditions may at least in part be implemented. In some embodiments, performance monitor 400 corresponds to performance monitor 108 of FIG. 1. Performance monitor 400 includes an N-stage ring oscillator 402. In the given example, ring oscillator 402 includes 3 stages. The frequency of ring oscillator 402 depends on the applied voltage and is captured in counter 404. In some embodiments, a signal 406 is employed to measure the frequency of ring oscillator 402. Signal 406 may correspond to or represent the system clock associated with a particular operating frequency of the associated device. However, signal 406 does not have to correspond to the current operating frequency of the device. For example, in some embodiments, signal 406 corresponds to the highest operating frequency of the device. The ring oscillator frequency captured in counter 404 is compared with a stored worst case reference value 408 to determine if the applied voltage can be safely lowered. If the frequency of ring oscillator 402 is higher than worst case reference value 408, the applied voltage can be lowered until it is slightly greater than or at the worst case frequency. Although not shown in FIG. 4, performance monitor 400 may include additional components, such as, for example, logic associated with generating an appropriate output signal such as signal 110 of FIG. 1 based upon the comparison of the current ring oscillator frequency and the worst case frequency, one or more interfaces, etc.

Each of the configurations presented in FIGS. 2, 3A, and 4 provides an example of a manner in which a performance monitor may at least in part be implemented. However, a performance monitor may be implemented with any appropriate configuration or combination of one or more configurations.

Figure 5:
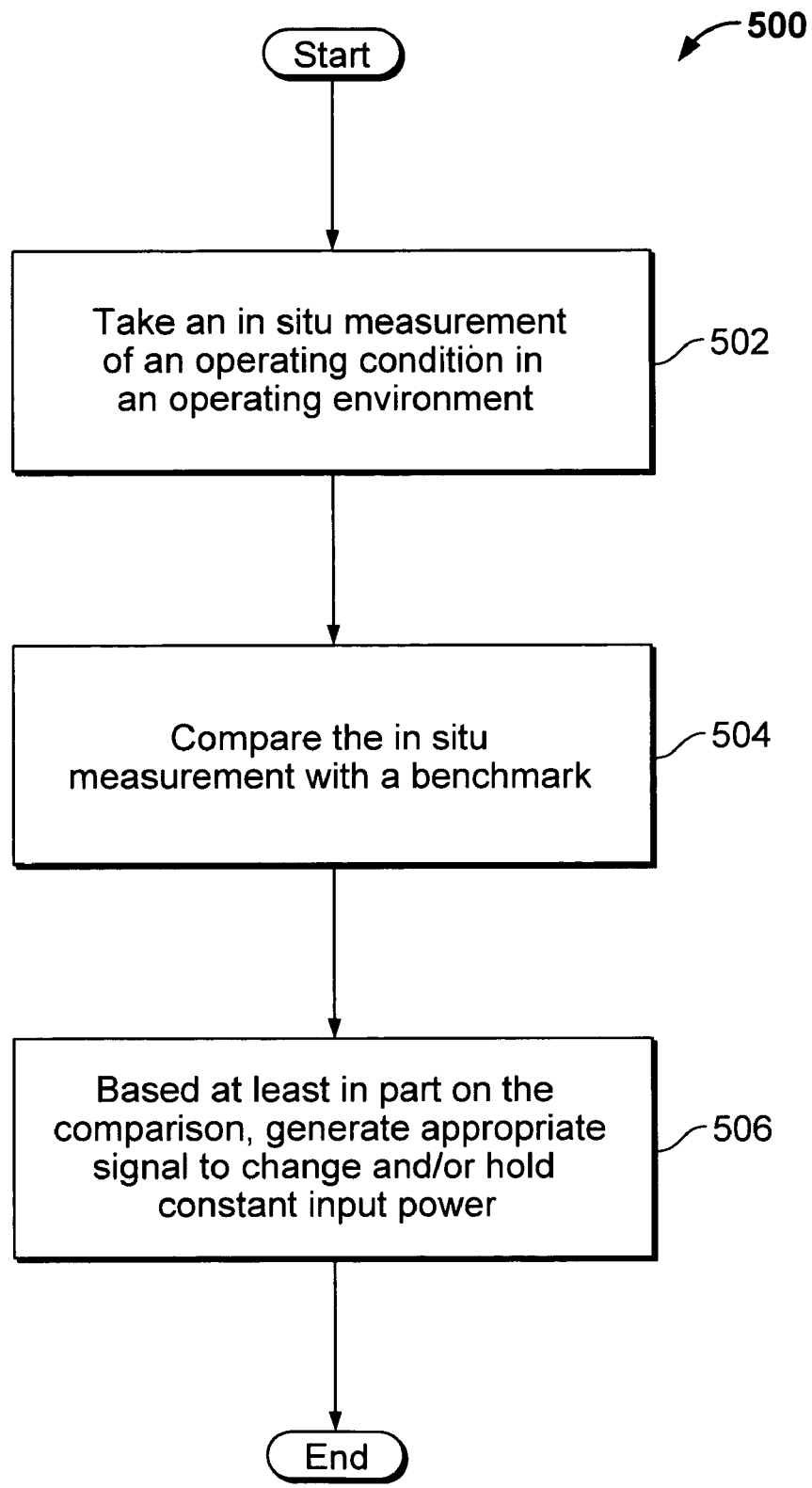
FIG. 5 illustrates an embodiment of a process for controlling the input power to a device or system.

FIG. 5 illustrates an embodiment of a process for controlling the input power to a device or system. Process 500 may be used by a performance monitor, such as performance monitor 108 of FIG. 1, 200 of FIG. 2, 300 of FIG. 3A, and 400 of FIG. 4. At 502, an in situ measurement of an operating condition in an operating environment is taken. For example, in the configuration of FIG. 2, the in situ measurement may at least in part correspond to the extent of propagation of the current system clock through a delay chain; in the configuration of FIG. 3A, the in situ measurement may at least in part correspond to the phase shift of a critically delayed version of the current system clock relative to a non-delayed version of the clock; and in the configuration of FIG. 4, the in situ measurement may at least in part correspond to the current ring oscillator frequency. At 504, the in situ measurement taken at 502 is compared with a benchmark associated with the measurement. For example, in the configuration of FIG. 2, the benchmark may correspond to the critical path delay; in the configuration of FIG. 3A, the benchmark may correspond to a phase shift of $2\pi$, for example; and in the configuration of FIG. 4, the benchmark may correspond to the worst case frequency reference value. In some embodiments, the benchmark includes a guard band. Based at least in part on the comparison at 504, an appropriate signal is generated at 506 to change and/or hold constant the input power of the device. In some embodiments, the signal generated at 506 corresponds to signal 110 of FIG. 1. The signal generated at 506 affects an appropriate change in the input power. For example, the input power may be increased, decreased, held constant, or reset to a nominal maximum value.

Figure 6:
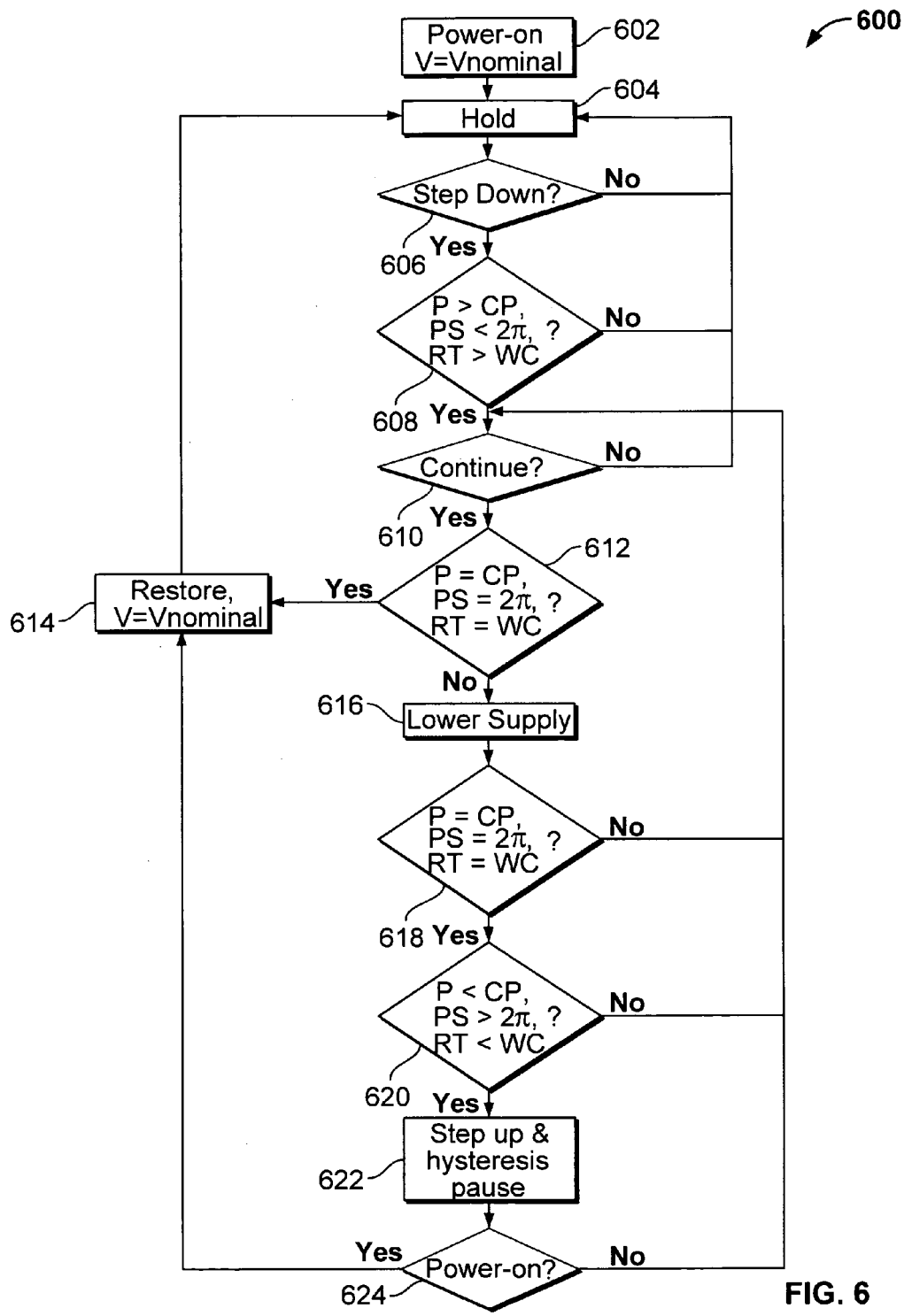
FIG. 6 illustrates an embodiment of a process for controlling the input power to a device or system.

FIG. 6 illustrates an embodiment of a process for controlling the input power to a device or system. At 602, the device is turned on and initialized, and the input power (e.g., voltage) supplied to the device is set to a maximum nominal value (e.g., Vnominal). In some embodiments, the maximum nominal value is based at least in part on the highest operating frequency of the device. In some embodiments, the input voltage supplied to the device at power-up (and/or reset) defaults to a level set by an associated feedback resistor divider network of the power supply. The input voltage is continued to be maintained at its current value at 604. In some embodiments, in such cases a performance monitor outputs a control signal (such as signal 110 of FIG. 1) that indicates that the present value of the input voltage is to be maintained. At 606, it is determined whether to step down the current input voltage. If it is determined at 606 not to step down the current input voltage, process 600 continues at 604. It may be determined at 606 to step down the current input voltage if the device is able to properly operate at a lower voltage, for example, due to a decrease in temperate and/or frequency. If it is determined at 606 to step down the current input voltage, it is determined at 608 whether one or more conditions that warrant stepping down the voltage are satisfied. For example, with respect to the configuration of FIG. 2, it may be determined at 608 whether the extent of propagation of the current system clock through a delay chain is greater than the critical path of the device; with respect to the configuration of FIG. 3A, it may be determined at 608 whether the phase shift of a critically delayed version of the current system clock relative to a non-delayed version of the clock is less than $2\pi$, for example; and with respect to the configuration of FIG. 4, it may be determined at 608 whether the current (i.e. real time) ring oscillator frequency is greater than the worst case reference frequency. If it is determined at 608 that one or more conditions that warrant stepping down the voltage are not satisfied, process 600 continues at 604. If it is determined at 608 that one or more conditions that warrant stepping down the voltage are satisfied, it is determined at 610 whether to continue. If it is determined at 610 not to continue, process 600 continues at 604.

If it is determined at 610 to continue, it is determined at 612 whether for current operating conditions the device is being supplied with the minimum input voltage that still guarantees operational integrity of the device. For example, with respect to the configuration of FIG. 2, it may be determined at 612 that for current operating conditions the device is being supplied with the minimum input voltage that still guarantees operational integrity of the device if the extent of propagation of the current system clock through a delay chain is equal to the critical path of the device; with respect to the configuration of FIG. 3A, it may be determined at 612 that for current operating conditions the device is being supplied with the minimum input voltage that still guarantees operational integrity of the device if the phase shift of a critically delayed version of the current system clock relative to a non-delayed version of the clock is $2\pi$, for example; and with respect to the configuration of FIG. 4, it may be determined at 612 that for current operating conditions the device is being supplied with the minimum input voltage that still guarantees operational integrity of the device if the current ring oscillator frequency is equal to the worst case reference frequency. If it is determined at 612 that for current operating conditions the device is being supplied with the minimum input voltage that still guarantees operational integrity of the device, the input voltage is restored to its maximum nominal value at 614 in anticipation of a frequency change, and process 600 continues at 604. In some embodiments, in such cases a performance monitor outputs a control signal (such as 110 of FIG. 1) that indicates that the input voltage is to be reset to its maximum nominal value.

If it is determined at 612 that for current operating conditions the device is not being supplied with the minimum input voltage that still guarantees operational integrity of the device, the input voltage supplied to the device is lowered at 616. In some embodiments, in such cases a performance monitor outputs a control signal (such as signal 110 of FIG. 1) that indicates that the input voltage is to be lowered. In some embodiments, the input voltage is lowered by a single increment at 616. At 618, it is again determined whether for current operating conditions the device is being supplied with the minimum input voltage that still guarantees operational integrity of the device. If it is determined at 618 that for current operating conditions the device is not being supplied with the minimum input voltage that still guarantees operational integrity of the device, process 600 continues at 610. If it is determined at 618 that for current operating conditions the device is being supplied with the minimum input voltage that still guarantees operational integrity of the device, it is determined at 620 whether the input voltage has become less than this minimum. In some embodiments, the value of the minimum input voltage does not correspond to the true minimum but includes an appropriate guard band. Therefore, the device may continue to operate properly. The input voltage may become less than the minimum, for example, if operating conditions such as die temperature increases due to ambient temperature increases occur. If it is determined at 620 that the input voltage is not less than the minimum, process 600 continues at 610. If it is determined at 620 that the input voltage is less than the minimum, the input voltage supplied to the device is increased. In some embodiments, in such cases a performance monitor outputs control signals (such as signal 110 of FIG. 1) that include step-up signals interleaved by pause commands to preclude thermal runaway until the input voltage is restored to at least its minimum acceptable value. At 624, it is determined whether the device has been restarted. If it is determined at 624 that the device has not been restarted, process 600 continues at 610. If it is determined at 624 that the device has been restarted, the input voltage is reset to its maximum nominal value at 614, and process 600 continues at 604. In some embodiments, process 600 continues while the device is on and ends when the device is turned off.

In some embodiments, the power control feedback signal output by a performance monitor of a device, such as signal 110 of FIG. 1, needs to be decoded and/or converted to a form suitable for input into an associated power supply. In such cases, the control signal output by a performance monitor may be processed by a dedicated component such as power supply control circuitry 112 of FIG. 1, where it is decoded and/or transformed into an appropriate form before being routed as an input to an associated power supply.

Figure 7:
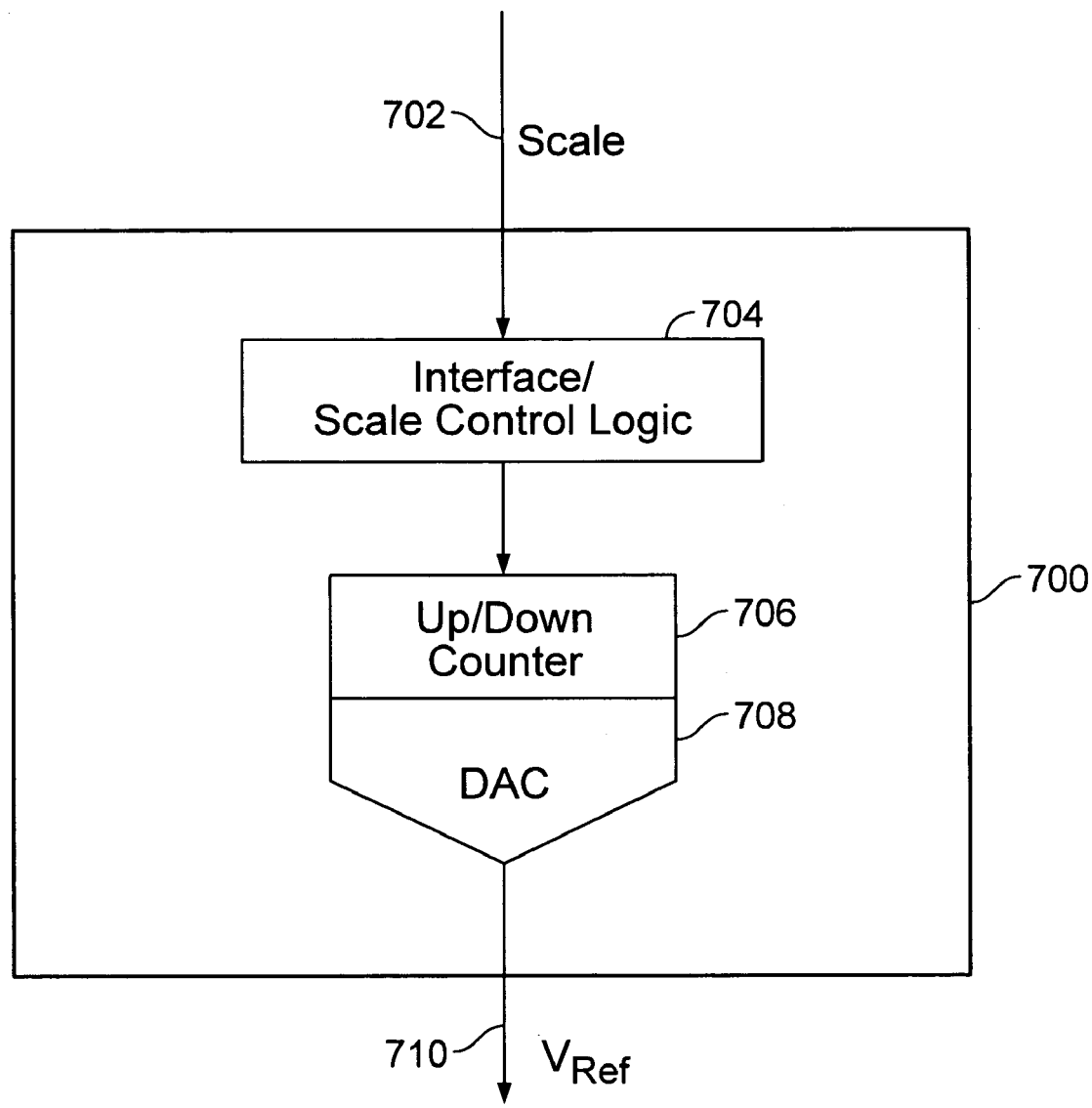
FIG. 7 illustrates an embodiment of a manner in which the power supply control circuitry may at least in part be implemented.

FIG. 7 illustrates an embodiment of a manner in which the power supply control circuitry may at least in part be implemented. In some embodiments, power supply control circuitry 700 corresponds to power supply control circuitry 112 of FIG. 1. A signal 702, sometimes referred to herein as the "scale" signal, output by a performance monitor of an associated device is input into power supply control circuitry 700 for processing. In some embodiments, scale signal 702 corresponds to signal 110 of FIG. 1. As depicted in the given example, power supply control circuitry includes interface/scale control logic 704, up/down counter 706, and digital to analog converter (DAC) 708. The DAC output 710 can be used to adjust the power supply's output voltage regulation reference point. In the configuration of FIG. 7, the input scale signal 702 is converted into a signal 710 that can be used by an associated power supply to control, the manner in which the supply output voltage is to be varied, if at all.

Power supply control circuitry 700 may be implemented as a stand-alone device and can be used to interface to almost any adjustable power supply. In some embodiments, power supply control circuitry 700 is integrated into an associated power supply, for example, to reduce component count. In such cases, the scale signal 702 output by a performance monitor of an associated device is input directly into the associated power supply, where it may be processed by embedded power supply control circuitry to convert it into a form suitable for controlling the power supply output. Alternatively, power supply control circuitry 700 may be integrated into a performance monitor or elsewhere in an associated device, and the corresponding scale signal may be directly input into an associated power supply and used to control the supply output. In some embodiments, a performance monitor and/or power supply control circuitry are implemented using a field programmable gate array (FPGA).

In some embodiments, supply sourcing current flow magnitude and rate of change may be sensed by scale control logic 704. Changes in the device supply current sensed in scale control circuitry 704 may be used at least in part to control supply output voltage. For example, as clock frequency decreases, the switching component of device current falls. Scale control logic 704 may sense a drop in current and allow the lowering of the power supply output voltage. Likewise, scale control logic 704 may facilitate the raising of the supply output voltage during an increase in current. Scale control logic 704, by virtue of obtaining information relating to the state of the device through scale signal 702, may control several other aspects of the supply's operation. In some embodiments, scale control 704 can be accessed via an $I^2C$ or similar interface directly from an associated device. That is, when used with an $I^2C$ interface, the device may be given direct control of scale control 704 by writing digital data directly into DAC 708. This allows preconditioning of the supply in anticipation of state changes in the device.

In some embodiments, the symbols associated with scale signal 702 correspond to the following four commands: increase supply output voltage, decrease supply output voltage, maintain supply output voltage at present level, and restore supply output voltage to its maximum level. In alternative embodiments, the symbols associated with scale signal 702 may correspond to any other appropriate commands and/or combination of commands. It is useful to select a command signaling scheme that minimizes the complexity of the command decode and execution logic required as well as the number of signals needed to communicate the commands. A simple command signaling scheme may be supported, for example, by the architecture of power supply control circuitry 700, which includes an up/down counter driving a DAC whose output may be used in turn to facilitate an appropriate adjustment of the supply output voltage. With such a configuration, for example, it is sufficient to transmit only the sense of the commands instead of a binary value. As a result, all four commands can be signaled by a single signal, such as scale 702. A binary data communications scheme (such as $I^2C$ or others) carrying the command information could also be used. In some embodiments, a single line signaling scheme may be used to make a non-programmable (non-adaptive) power supply programmable (adaptive). The signal may be encoded in any appropriate manner.

Figure 8:
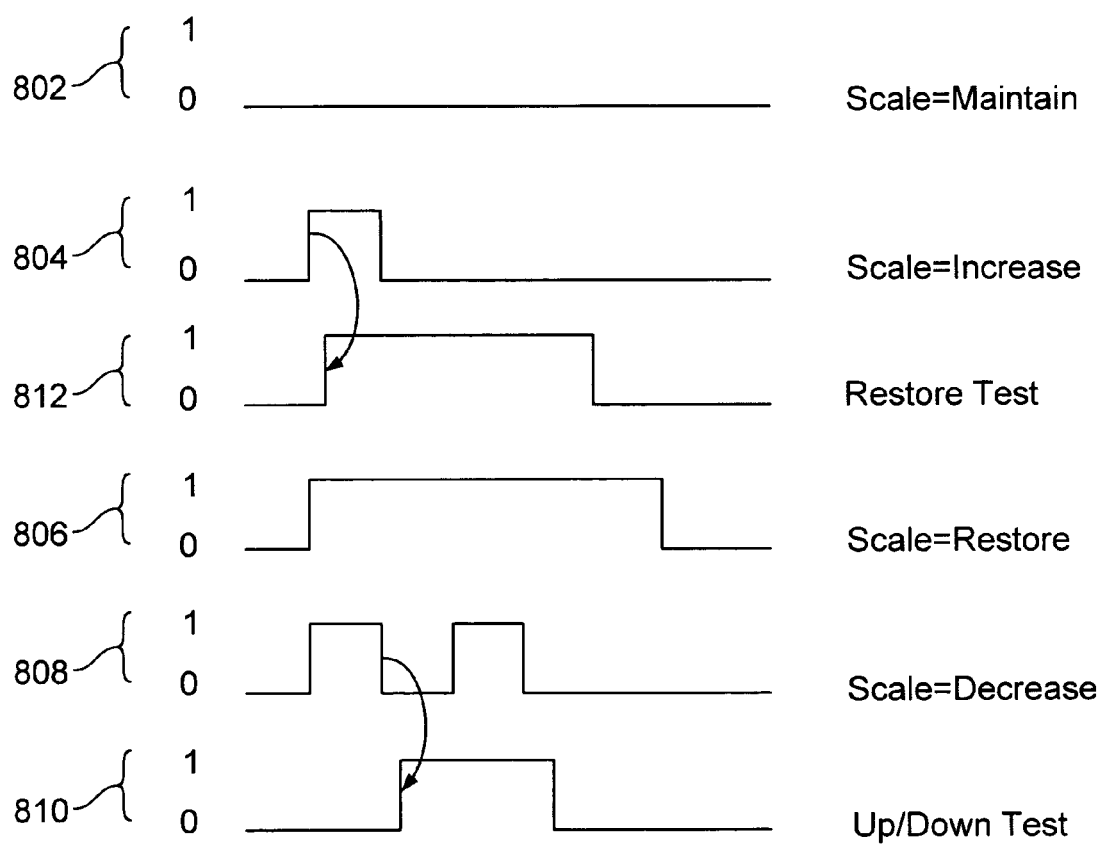
FIG. 8 illustrates an embodiment of a manner in which a scale signal may be encoded to represent different commands and decoded.

FIG. 8 illustrates an embodiment of a manner in which a scale signal may be encoded to represent different commands and decoded. In some embodiments, the scale signal of FIG. 8 corresponds to signal 110 of FIG. 1. In some embodiments, the scale signal of FIG. 8 corresponds to scale signal 702 of FIG. 7. In the given example, a zero logic level 802 corresponds to the command "maintain the current output voltage level"; a single short pulse 804 corresponds to the command "incrementally increase the output voltage level one step"; a single long pulse 806 corresponds to the command "restore the output voltage to its maximum level"; and a sequence of two short pulses 808 corresponds to the command "incrementally decrease the output voltage level one step". In some embodiments, the scale signal is decoded and an appropriate corresponding power supply control signal such as Vref 710 of FIG. 7 is generated by power supply control circuitry such as 700 of FIG. 7. In some embodiments, the scale signal is directly input into a power supply. Upon detecting the arrival of one or more pulse(s), any appropriate set of one or more tests may be initiated to decode the command inherent in the signal. For example, a test may be based at least in part on the number of pulse(s) to determine whether the command is to incrementally increase or decrease the supply output voltage, and another test may be based at least in part on the duration of the pulse(s) to determine if the command is to restore or increase. With respect to the example given in FIG. 8, if during the up/down test window 810 a second pulse arrives, the command is interpreted as a decrease, and otherwise it is interpreted as an increase. Likewise, if the pulse remains after the restore test window 812, the command is interpreted as a restore.

Figure 9:
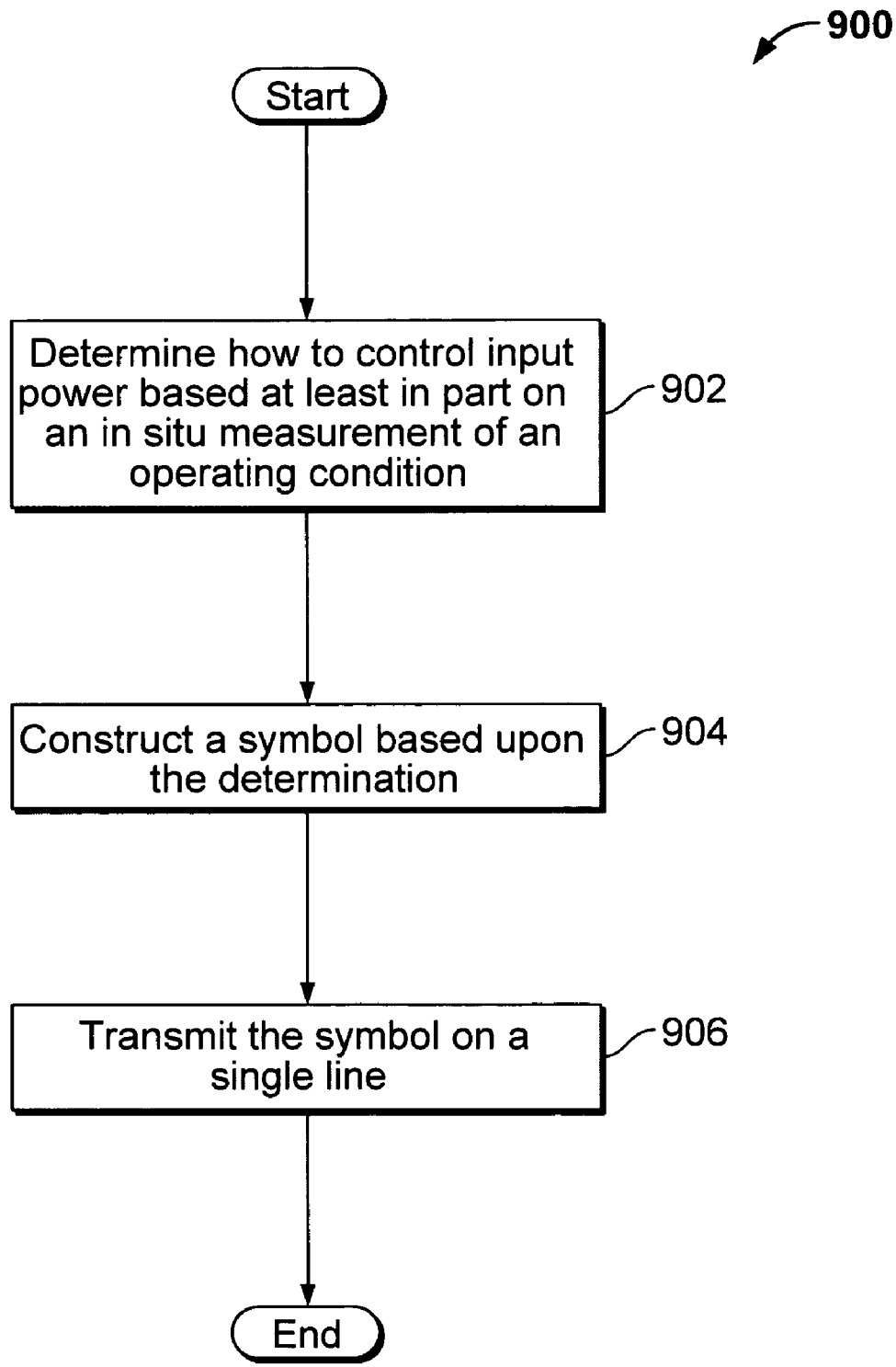
FIG. 9 illustrates an embodiment of a process for communicating a power control feedback signal from a device or system.

FIG. 9 illustrates an embodiment of a process for communicating a power control feedback signal from a device or system. In some embodiments, process 900 is employed by a performance monitor, such as 110 of FIG. 1, 200 of FIG. 2, 300 of FIG. 3A, and 400 of FIG. 4. At 902, it is determined how to control the input power based at least in part on an in situ measurement of an operating condition. For example, it may be determined at 902 to command an increase in input power, a decrease in input power, a reset of input power to its maximum, or to hold constant the current input power. The in situ measurement may correspond to any appropriate parameter that can be measured to determine real time device power needs. For example, in the configuration of FIG. 2, the in situ measurement may at least in part correspond to the extent of propagation of the current system clock through a delay chain; in the configuration of FIG. 3A, the in situ measurement may at least in part correspond to the phase shift of a critically delayed version of the current system clock relative to a non-delayed version of the clock; and in the configuration of FIG. 4, the in situ measurement may at least in part correspond to the current ring oscillator frequency. At 904, a symbol is constructed based upon the determination at 902. A unique symbol is constructed for each possible control outcome or command. In some embodiments, the symbol constructed at 904 corresponds to one of 802-808 of FIG. 8. At 906, the symbol is transmitted on a single line to, for example, associated intermediary power supply control circuitry or an integrated power supply. In some embodiments, the single line corresponds to signal 110 of FIG. 1 or scale signal 702 of FIG. 7. In some embodiments, the single line corresponds to the reference voltage input signal of an associated power supply.

In some embodiments, commands may be communicated using dual signal lines, e.g., $S_1$ and $S_2$. Any appropriate encoding of the two signal lines may be used to represent the commands. For example, a logic zero on both signals may correspond to the maintain command, a coincident pulse on both lines may correspond to the restore command, a pulse on $S_1$ while $S_2$ is held at logic zero may correspond to the increase command, and a pulse on $S_2$ while $S_1$ is held low may correspond to the decrease command.

In some embodiments, the same power supply may supply multiple devices. In such cases, it is possible through combinatorial logic to assure proper operation Of all devices by applying first precedence to any restore or increase requests, second precedence to maintain requests, and finally responding to decrease requests.

In configurations in which the input power supplied to a device is varied based upon real time device operating conditions such as operating frequency, it may be necessary to ensure that a corresponding increase in input power occurs before an increase in operating frequency so that device operational integrity is not compromised. In some configurations, the frequency of the system clock of a device is monitored, and the system clock is temporarily halted when an increase in frequency is detected. The clock is restarted and/or reapplied when the input power supplied to the device is adequate to support device operation at the increased frequency. In some embodiments, the system clock is automatically stopped by the device for a prescribed period of time prior to entering a state associated with a higher frequency so that an associated power supply can be accordingly adjusted. In some embodiments, when a stopped clock is detected, a frequency increase is anticipated, and consequently the power supply output is reset to its maximum value.

Figure 10:
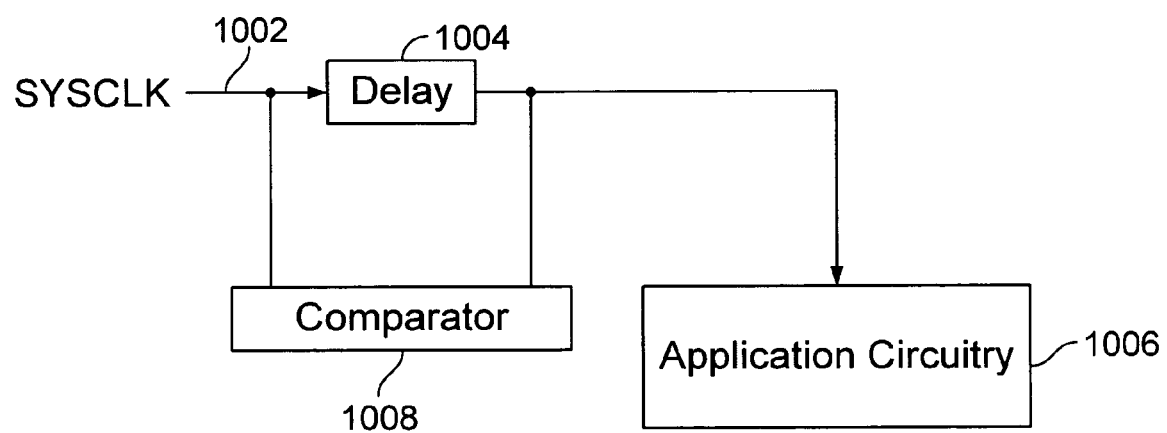
FIG. 10 illustrates an embodiment of a manner in which the system clock may be delayed to ensure proper device operation.

Instead of being stopped, in some embodiments, a clock signal is delayed to ensure proper device operation. FIG. 10 illustrates an embodiment of a manner in which the system clock may be delayed to ensure proper device operation. As shown, system clock 1002 is delayed by delay element 1004 before being applied to application circuitry 1006. In some embodiments, delay element 1004 is a buffer. Delay 1004 produces a latency which is at least longer than the maximum amount of time needed to adjust the supply output combined with the maximum amount of time necessary for signaling the supply to update its output. A comparator 1008 compares the system clock before and after delay 1004 to detect changes in frequency. Based upon a detected change in frequency, comparator 1008 may appropriately signal an associated power supply to adjust its output voltage so that by the time the system clock is actually applied to application circuitry 1006, the power supply is providing sufficient power.

Figure 11:
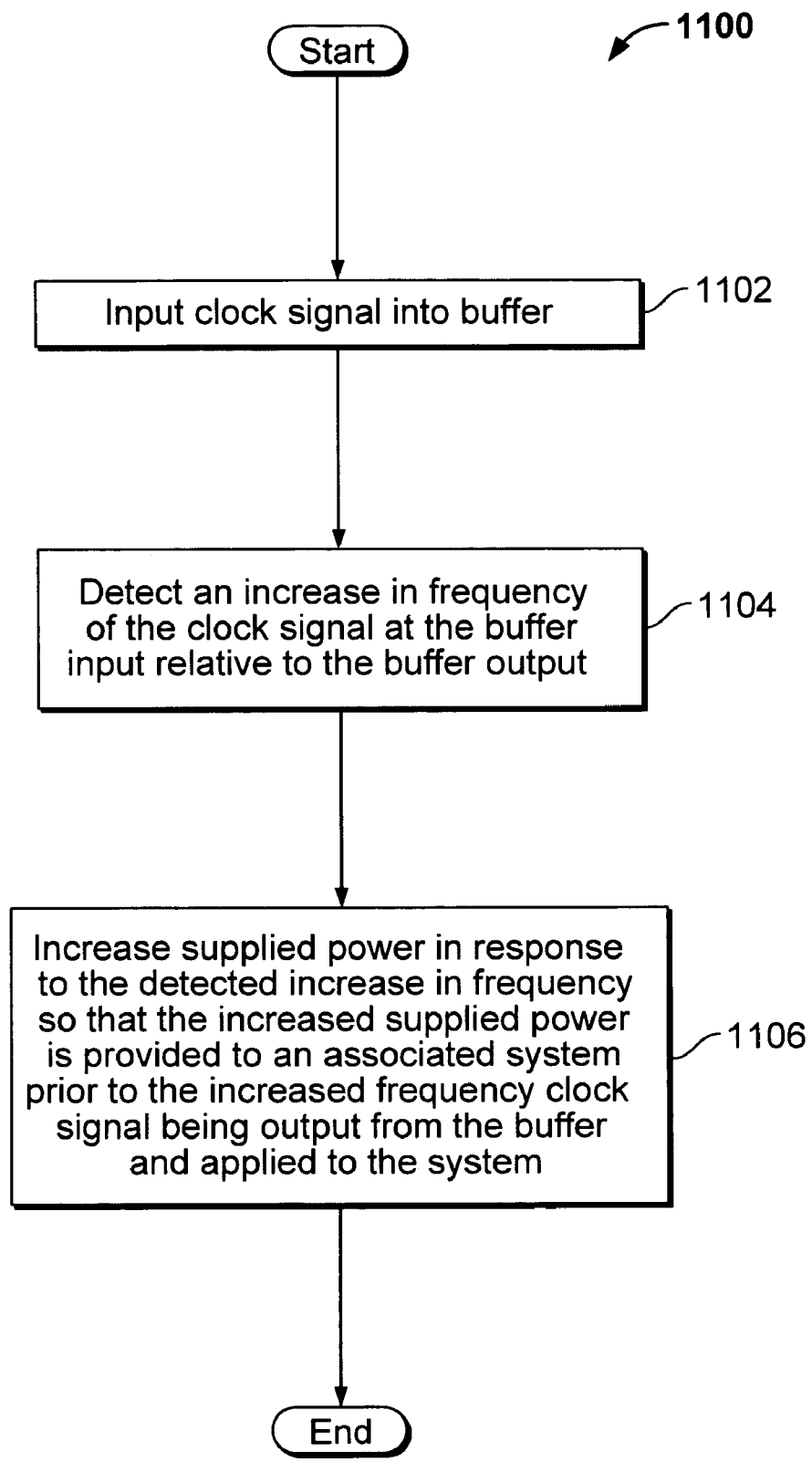
FIG. 11 illustrate an embodiment of a process for adjusting power in response to a clock signal frequency increase.

FIG. 11 illustrate an embodiment of a process for adjusting power in response to a clock signal frequency increase. In some embodiments, process 1100 is used with the configuration of FIG. 10. At 1102, a system clock signal is input into a buffer. In some embodiments, the system clock signal is input into a buffer to induce a delay or latency that is commensurate with the amount of time needed to appropriately adjust the output power of an associated power supply so that the system clock signal is not applied until an acceptable input power is available. At 1104, an increase in frequency of the clock signal at the buffer input relative to the buffer output is detected. At 1106, the supplied power is increased in response to the detected increase in frequency at 1104 so that the increased supplied power is provided to an associated system prior to the increased frequency clock signal being output from the buffer and applied to the system. In some embodiments, the supplied power is reset to its maximum at 1106. In some embodiments, 1104 includes detecting a decrease in frequency, and 1106 includes decreasing the supplied power so that the decreased supplied power is provided to an associated system prior to a decreased frequency clock signal being output from a buffer and applied to the system so that power consumption can be minimized.

Figure 12:
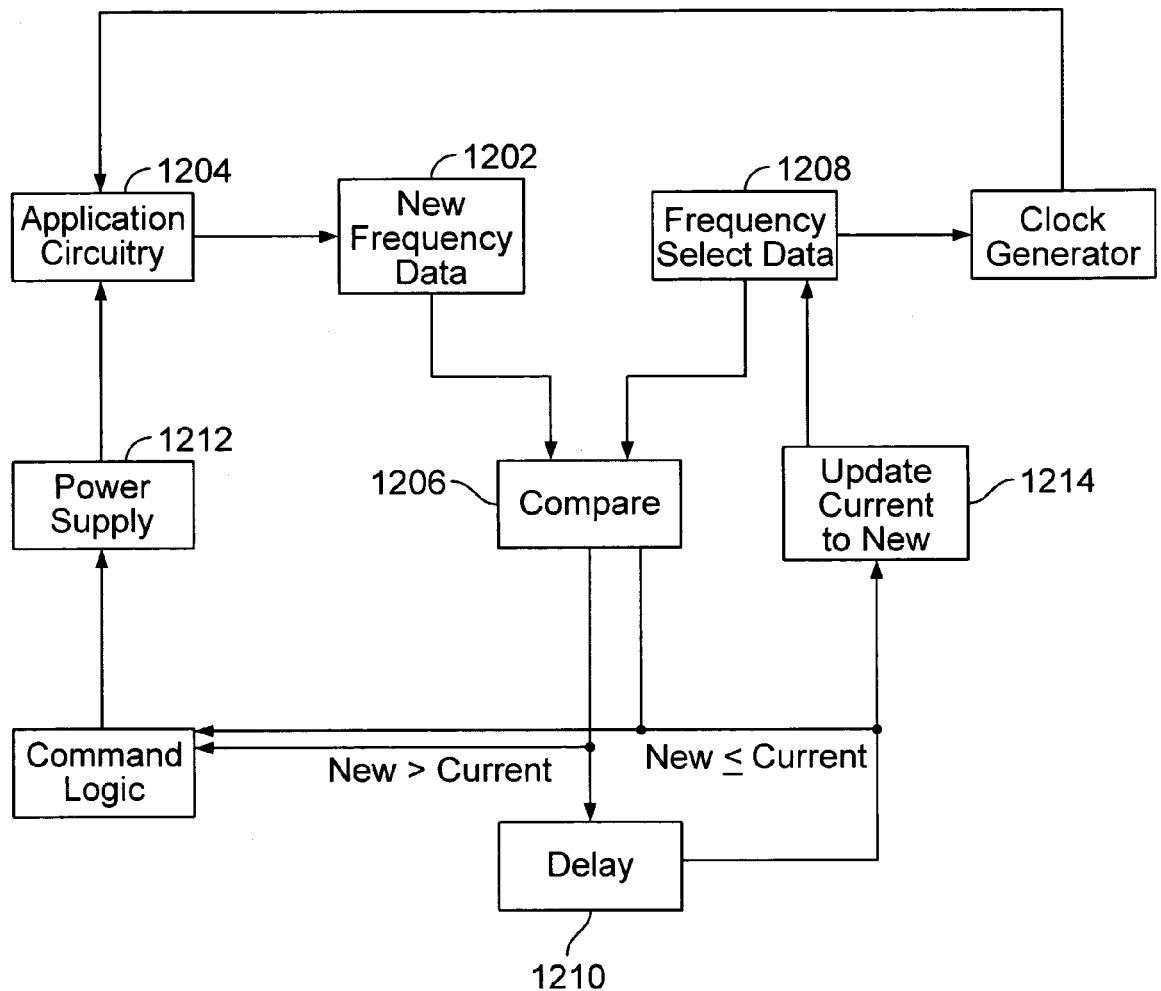
FIG. 12 illustrates an embodiment of a manner in which the system clock may be delayed when an increase in clock frequency is detected.

FIG. 12 illustrates an embodiment of a manner in which the system clock may be delayed when an increase in clock frequency is detected. In the given example, a new frequency 1202 needed by application circuitry 1204 is compared at 1206 with the current frequency read from frequency selector 1208. If the new frequency is greater than the current frequency, the new frequency data is delayed at delay 1210, and power supply 1212 is signaled to appropriately adjust its output, for example, an increase in or reset of the supply output may be signaled. The delay time associated with delay 1210 is at least longer than the maximum amount of time needed to adjust the supply output combined with the amount of time necessary for signaling the supply to update its output. Delay 1210 is instituted so that the current frequency is updated to the new frequency 1214 only after the supply has been given sufficient time to appropriately adjust its output. If the new frequency is less than or equal to the current frequency, power supply 1212 is appropriately signaled (e.g., to lower or maintain the supply output), but there is no need to delay updating the current frequency to the new frequency 1214, if necessary, because an adequate or excessive amount of input power is already being supplied by power supply 1212.

Figure 13:
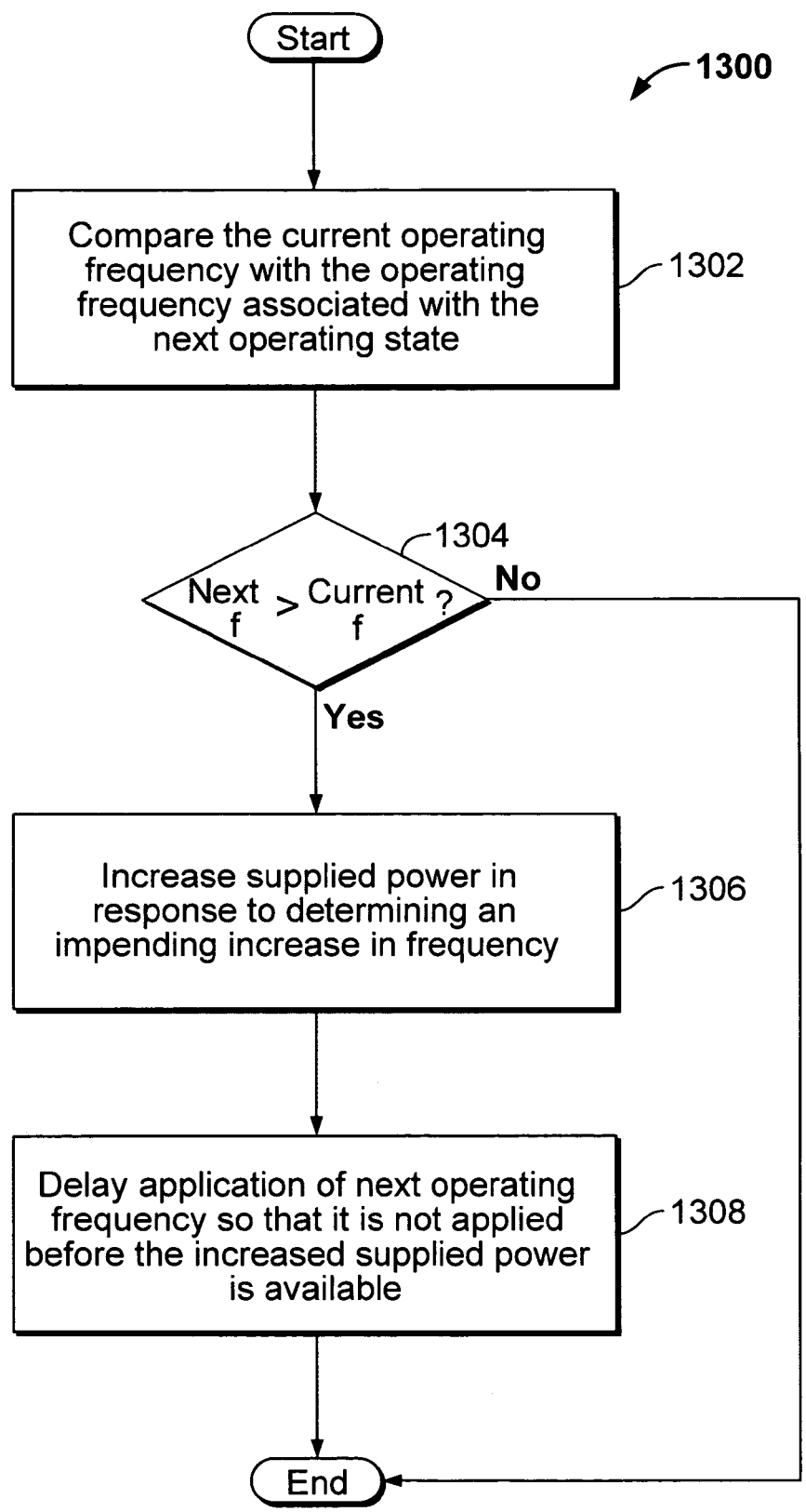
FIG. 13 illustrates an embodiment of a process for adjusting power in response to an increase in operating frequency.

FIG. 13 illustrates an embodiment of a process for adjusting power in response to an increase in operating frequency. In some embodiments, process 1300 is used with the configuration of FIG. 12. At 1302, the current operating frequency is compared with the operating frequency associated with the next operating state. Based on the comparison at 1302, at 1304 it is determined if the next operating frequency is greater than the current operating frequency. If it is determined at 1304 that the next operating frequency is not greater than the current operating frequency, process 1300 ends. In some embodiments, if it is determined at 1304 that the next operating frequency is not greater than the current operating frequency, it is determined whether the next operating frequency is less than the current operating frequency, and, if so, the supplied power may be decreased. If it is determined at 1304 that the next operating frequency is greater than the current operating frequency, the supplied power is increased at 1306 in response to determining an impending increase in frequency at 1304. In some embodiments, the supplied power is reset to its maximum at 1306. At 1308, the application of the next operating frequency is delayed by a prescribed amount so that it is not applied before the increased supplied power is available.

In some embodiments, in the configuration of FIG. 1, power supply 104 corresponds to a first power supply and device 102 corresponds to a second power supply. In such cases, performance monitor 108 of power supply 102 is a circuit that determines the manner in which input voltage 106 should be varied so that it is at or near the minimum input voltage needed by power supply 102. The minimum input voltage 106 needed by power supply 102 is based at least in part on the output voltage supplied or drawn from power supply 102. In some embodiments, the minimum input voltage 106 needed by power supply 102 is equal to the output voltage supplied by power supply 102 plus a prescribed amount of headroom voltage, wherein the headroom voltage represents the operating margin required by power supply 102 to remain in regulation. Based upon current operating conditions of power supply 102, performance monitor 108 generates an appropriate output signal 110 that can be used by power supply 104 to accordingly vary its output voltage 106. In some embodiments, signal 110 does not need to be processed by additional power supply control circuitry 112 and may be directly input into power supply 104. In some embodiments, power supply 102 is used to power a device that includes a performance monitor (such as performance monitor 200 of FIG. 2, 300 of FIG. 3A, and 400 of FIG. 4) to control the input voltage supplied to it from power supply 102. In such cases, the power control feedback signal generated by the device may be used at least in part by power supply 102 to generate an appropriate output voltage and/or a control signal associated with regulating its input voltage 106.

In some embodiments, power supply 102 is a linear supply such as a low dropout regulator (LDO) which is driven by another power supply 104, such as a step down, step up, or step up/step down supply. In some embodiments, performance monitor 108 of LDO 102 measures the LDO input voltage 106 and the LDO output voltage, factors in a voltage value corresponding to LDO drop out voltage, and generates a signal 110 which may be combined in power supply 104 with a measure of the output voltage 106 of power supply 104 to generate a feedback signal for power supply 104. In some embodiments, a signal is developed which is proportional to the amount of current flowing through a pass transistor associated with the LDO 102. This may be done by monitoring the voltages being applied to the pass transistor's source and/or drain and gate and knowing the characteristics of the pass transistor. Such a signal can be used in conjunction with the V/I curve of the pass transistor to generate signal 110.

As described herein, the power supplied to a device may be varied with respect to real time device operating conditions. Real time device operating conditions may be monitored using a dedicated component of the device, and such a component may generate an appropriate power control feedback signal to identify the manner in which the power output should be varied to sustain the device with just enough power to operate correctly so that power can be conserved. The application of an increased operating frequency in such a device may be delayed so that the supplied power can be appropriately adjusted to accommodate the increased frequency.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
determine a real time value of an operating condition;
compare the real time value of the operating condition to a reference value;
based on the comparison, determine a manner in which to adjust input power to maintain the operating condition at or near the reference value; and
generate a control signal to control input power based on the determination of the manner in which to adjust input power; and
an interface configured to output the control signal;
wherein the operating condition comprises a phase shift of a critically delayed version of a current system clock relative to a non-delayed version of the current system clock, wherein the reference value comprises a predetermined amount of phase shift, and wherein to determine a manner in which to adjust input power comprises to determine to decrease input power if the real time value of the phase shift of the critically delayed version of the current system clock relative to the non-delayed version of the current system clock is less than the predetermined amount of phase shift.

2. The system of claim 1, wherein the reference value includes a guard band.

3. A method, comprising:
   determining a real time value of an operating condition;
   comparing the real time value of the operating condition to a reference value;
   based on the comparison, using a processor to determine a manner in which to adjust input power to maintain the operating condition at or near the reference value; and
   generating a control signal to control input power based on the determination of the manner in which to adjust input power;
   wherein the operating condition comprises a phase shift of a critically delayed version of a current system clock relative to a non-delayed version of the current system clock, wherein the reference value comprises a predetermined amount of phase shift, and wherein to determine a manner in which to adjust input power comprises to determine to decrease input power if the real time value of the phase shift of the critically delayed version of the current system clock relative to the non-delayed version of the current system clock is less than the predetermined amount of phase shift.

4. A computer program product embodied in a non-transitory computer readable storage medium and configured to cause a computer to:
   determine a real time value of an operating condition;
   compare the real time value of the operating condition to a reference value;
   based on the comparison, determine a manner in which to adjust input power to maintain the operating condition at or near the reference value; and
   generate a control signal to control input power based on the determination of the manner in which to adjust input power;
   wherein the operating condition comprises a phase shift of a critically delayed version of a current system clock relative to a non-delayed version of the current system clock, wherein the reference value comprises a predetermined amount of phase shift, and wherein to determine a manner in which to adjust input power comprises to determine to decrease input power if the real time value of the phase shift of the critically delayed version of the current system clock relative to the non-delayed version of the current system clock is less than the predetermined amount of phase shift.

5. A system, comprising:
   a processor configured to:
      determine a real time value of an operating condition;
      compare the real time value of the operating condition to a reference value;
      based on the comparison, determine a manner in which to adjust input power to maintain the operating condition at or near the reference value; and
      generate a control signal to control input power based on the determination of the manner in which to adjust input power; and
   an interface configured to output the control signal;
   wherein the operating condition comprises an extent of propagation of a current system clock through a delay chain, wherein the reference value comprises a delay corresponding to a critical path delay, and wherein to determine a manner in which to adjust input power comprises to determine to decrease input power if the real time value of the extent of propagation of the current system clock through the delay chain is greater than the critical path delay.

6. The system of claim 5, wherein the reference value is determined using system characterization and/or simulation.

7. The system of claim 5, wherein the reference value includes a guard band.

8. A method, comprising:
   determining a real time value of an operating condition;
   comparing the real time value of the operating condition to a reference value;
   based on the comparison, using a processor to determine a manner in which to adjust input power to maintain the operating condition at or near the reference value; and
   generating a control signal to control input power based on the determination of the manner in which to adjust input power;
   wherein the operating condition comprises an extent of propagation of a current system clock through a delay chain, wherein the reference value comprises a delay corresponding to a critical path delay, and wherein to determine a manner in which to adjust input power comprises to determine to decrease input power if the real time value of the extent of propagation of the current system clock through the delay chain is greater than the critical path delay.

9. A computer program product embodied in a non-transitory computer readable storage medium and configured to cause a computer to:
   determine a real time value of an operating condition;
   compare the real time value of the operating condition to a reference value;
   based on the comparison, determine a manner in which to adjust input power to maintain the operating condition at or near the reference value; and
   generate a control signal to control input power based on the determination of the manner in which to adjust input power;
   wherein the operating condition comprises an extent of propagation of a current system clock through a delay chain, wherein the reference value comprises a delay corresponding to a critical path delay, and wherein to determine a manner in which to adjust input power comprises to determine to decrease input power if the real time value of the extent of propagation of the current system clock through the delay chain is greater than the critical path delay.

10. A system, comprising:
    a processor configured to:
       determine a real time value of an operating condition;
       compare the real time value of the operating condition to a reference value;
       based on the comparison, determine a manner in which to adjust input power to maintain the operating condition at or near the reference value; and
       generate a control signal to control input power based on the determination of the manner in which to adjust input power; and
    an interface configured to output the control signal;
    wherein the operating condition comprises a ring oscillator frequency, wherein the reference value comprises a minimum acceptable ring oscillator frequency determined under a worst case system operating environment, and wherein to determine a manner in which to adjust input power comprises to determine to decrease input power if the real time ring oscillator frequency is greater than the minimum acceptable ring oscillator frequency.

11. The system of claim 10, wherein the worst case system operating environment comprises one or more of highest operating frequency, lowest supply voltage, highest ambient temperature, and slowest semiconductor process parameters.

12. The system of claim 10, wherein the reference value is determined using system characterization and/or simulation.

13. The system of claim 10, wherein the reference value includes a guard band.

14. A method, comprising:
   determining a real time value of an operating condition;
   comparing the real time value of the operating condition to a reference value;
   based on the comparison, using a processor to determine a manner in which to adjust input power to maintain the operating condition at or near the reference value; and
   generating a control signal to control input power based on the determination of the manner in which to adjust input power;
   wherein the operating condition comprises a ring oscillator frequency, wherein the reference value comprises a minimum acceptable ring oscillator frequency determined under a worst case system operating environment, and wherein to determine a manner in which to adjust input power comprises to determine to decrease input power if the real time ring oscillator frequency is greater than the minimum acceptable ring oscillator frequency.

15. A computer program product embodied in a non-transitory computer readable storage medium and configured to cause a computer to:
   determine a real time value of an operating condition;
   compare the real time value of the operating condition to a reference value;
   based on the comparison, determine a manner in which to adjust input power to maintain the operating condition at or near the reference value; and
   generate a control signal to control input power based on the determination of the manner in which to adjust input power;
   wherein the operating condition comprises a ring oscillator frequency, wherein the reference value comprises a minimum acceptable ring oscillator frequency determined under a worst case system operating environment, and wherein to determine a manner in which to adjust input power comprises to determine to decrease input power if the real time ring oscillator frequency is greater than the minimum acceptable ring oscillator frequency.

* * * * *